US010419892B2

United States Patent
Mazzarese et al.

(10) Patent No.: US 10,419,892 B2
(45) Date of Patent: Sep. 17, 2019

(54) BASE STATION SIGNAL TRANSMISSION METHOD, BASE STATION AND TERMINAL

(71) Applicant: HUAWEI TECHNOLOGIES CO., LTD., Shenzhen (CN)

(72) Inventors: David jean-marie Mazzarese, Beijing (CN); Jingyuan Sun, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 36 days.

(21) Appl. No.: 15/357,046

(22) Filed: Nov. 21, 2016

(65) Prior Publication Data

US 2017/0070865 A1  Mar. 9, 2017

Related U.S. Application Data

(63) Continuation of application No. PCT/CN2014/078129, filed on May 22, 2014.

(51) Int. Cl.
*H04W 4/06* (2009.01)
*H04W 72/04* (2009.01)
(Continued)

(52) U.S. Cl.
CPC ............ *H04W 4/06* (2013.01); *H04L 5/003* (2013.01); *H04L 5/0094* (2013.01);
(Continued)

(58) Field of Classification Search
CPC ..... H04L 5/003; H04L 5/0048; H04L 5/0053; H04L 5/0007; H04L 5/0051;
(Continued)

(56) References Cited

U.S. PATENT DOCUMENTS 9,219,994 B2   12/2015  Park et al.
2009/0252077 A1*  10/2009  Khandekar ......... H04W 72/082
                                                                370/312
(Continued)

FOREIGN PATENT DOCUMENTS

CA         2715010       10/2009
CN      101959139 A       1/2011
(Continued)

OTHER PUBLICATIONS

International Search Report dated Mar. 3, 2015 in corresponding International Application No. PCT/CN2014/078129.
(Continued)

*Primary Examiner* — Peter Chen
(74) *Attorney, Agent, or Firm* — Staas & Halsey LLP

(57) ABSTRACT

The embodiments of present invention relates to a signal transmission method and an apparatus. The signal transmission method includes: performing, by a base station, rate matching of a unicast signal according to a multicast/broadcast single frequency network MBSFN reference signal MBSFN RS; and sending, by the base station, the unicast signal to user equipment UE. By means of the signal transmission method and the apparatus, resource usage can be increased, and continuity and effectiveness of performing broadcast multicast related measurement by UE are ensured.

13 Claims, 4 Drawing Sheets

(51) Int. Cl.
  *H04L 5/00* (2006.01)
  *H04W 88/02* (2009.01)
  *H04W 88/08* (2009.01)
  *H04W 72/00* (2009.01)

(52) U.S. Cl.
  CPC ....... *H04W 72/04* (2013.01); *H04W 72/0406* (2013.01); *H04W 72/005* (2013.01); *H04W 88/02* (2013.01); *H04W 88/08* (2013.01)

(58) Field of Classification Search
  CPC .. H04L 5/0094; H04L 27/2613; H04W 72/02; H04W 72/04; H04W 72/005; H04W 72/042; H04W 72/0406; H04W 72/0446; H04W 72/1289; H04W 88/02; H04W 88/08; H04W 4/06
  See application file for complete search history.

(56) References Cited

U.S. PATENT DOCUMENTS

| | | | | |
|---|---|---|---|---|
| 2010/0189047 A1* | 7/2010 | Baum | .................... | H04B 7/024 370/329 |
| 2011/0013574 A1* | 1/2011 | Hsu | .................... | H04W 72/005 370/329 |
| 2011/0164549 A1* | 7/2011 | Huang | .................. | H04L 5/0007 370/312 |
| 2013/0114498 A1* | 5/2013 | Park | ........................ | H04W 4/06 370/312 |
| 2016/0043848 A1* | 2/2016 | Kim | ..................... | H04L 5/0051 370/280 |

FOREIGN PATENT DOCUMENTS

| | | |
|---|---|---|
| CN | 101998273 A | 3/2011 |
| CN | 102007807 | 4/2011 |
| CN | 102104838 | 6/2011 |
| CN | 102448019 | 5/2012 |
| CN | 103945546 A | 7/2014 |
| EP | 2276276 | 1/2011 |

OTHER PUBLICATIONS

International Search Report, dated Mar. 3, 2015, in International Application No. PCT/CN2014/078129 (5 pp.).
Extended European Search Report, dated Apr. 21, 2017, in European Application No. 14892471.5 (11 pp.).
*Unicast transmission in MBMS subframe*, 3GPP TSG-RAN WG2 Meeting #67, R2-094421, Aug. 24-28, 2009, Shenzhen, China (2 pp.).
*Unicast Reuse of MBSFN-reserved Subframes*, 3GPP TSG-RAN WG1 Meeting #58bis, R1-093888, Oct. 12-16, 2009, Miyazaki, Japan (5 pp.).
*3rd Generation Partnership Project; Technical Specification Group Radio Access Network; Evolved Universal Terrestrial Radio Access (E-UTRA); Physical layer; Measurements* (Release 11), 3GPP TS 36.214 V11.1.0 (Dec. 2012), pp. 1-14.
*3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2* (Release 12), 3GPP TS 37.320 V12.0.0 (Mar. 2014), pp. 1-23.
Canadian Office Action dated Oct. 11, 2017 in corresponding Canadian Patent Application No. 2,949,870.
Chinese Office Action for Chinese Application No. 201480079165.0 dated Feb. 28, 2019.

* cited by examiner

BASE STATION SIGNAL TRANSMISSION METHOD, BASE STATION AND TERMINAL

CROSS-REFERENCE TO RELATED APPLICATIONS

This application is a continuation of International Application No. PCT/CN2014/078129, filed on May 22, 2014, the disclosure of which is hereby incorporated by reference in its entirety.

TECHNICAL FIELD

The present invention relates to the field of communications technologies, and in particular, to a signal transmission method and an apparatus.

BACKGROUND

During wireless network transmission, there are unicast transmission and broadcast multicast transmission. A multimedia broadcast multicast service (MBMS) transmission mode is one of broadcast multicast transmission. In this transmission mode, multiple cells send data to multiple user equipments (UE) by using a data transmission method of a single frequency network (SFN). In this case, a subframe needs to be reserved to transmit MBMS data.

Data corresponding to an MBMS is transmitted by an MBMS control node at a network side to all base stations in a multicast/broadcast single frequency network (MBSFN) area corresponding to the MBMS data, and then is sent by these base stations to UE in an MBSFN manner. An MBSFN reference signal (MBSFN RS) is used to perform MBMS related measurement and demodulate the MBMS data.

In an MBMS communications system, congestion may occur at a network side, or MBMS data is interrupted due to some reasons, that is, a base station does not receive the MBMS data sent by a node at the network side. In this case, a reserved subframe can only be idle. As a result, resource usage is low.

SUMMARY

The present invention provides a signal transmission method and an apparatus, so as to increase resource usage, and ensure continuity and effectiveness of performing broadcast multicast related measurement by UE.

A first aspect of the present invention provides a base station, where the base station includes: a processor and a transceiver, where the transceiver is configured to interact with user equipment UE; and the processor is configured to perform rate matching of a unicast signal according to a multicast/broadcast single frequency network reference signal MBSFN RS; and send, by using the transceiver, the unicast signal to the UE.

With reference to the first aspect, in a first possible implementation manner of the first aspect, the processor is further configured to send downlink control information DCI to the UE by using the transceiver, where the DCI is used to instruct the UE to perform rate de-matching and receive the unicast signal according to the MBSFN RS.

With reference to the first aspect, in a second possible implementation manner of the first aspect, a subframe in which the processor sends the unicast signal by using the transceiver includes one or more of: a cell-specific reference signal CRS, a channel state information-reference signal CSI-RS, a channel state information-interference measurement resource CSI-IMR, a demodulation reference signal DMRS, or a positioning reference signal PRS.

With reference to the first aspect or the first or the second possible implementation manner of the first aspect, in a third possible implementation manner of the first aspect, the processor is further configured to send control signaling to the UE by using the transceiver, where the control signaling is used to indicate that a first RE or an RE group in an RE corresponding to a pilot signal used to demodulate the unicast signal is not used to demodulate the unicast signal.

With reference to the third possible implementation manner of the first aspect, in a fourth possible implementation manner of the first aspect, the first RE or the RE group is specifically:

an RE or an RE group or a subset of an RE group on which a demodulation pilot corresponding to the unicast signal is overlapped with the MBSFN RS, or an RE or an RE group that is predefined or that is configured by higher layer signaling.

With reference to the first aspect, in a fifth possible implementation manner of the first aspect, the base station is an evolved NodeB eNodeB, a radio base station NodeB, a radio network controller RNC, or a repeater.

According to a second aspect, the present invention further provides user equipment, where the user equipment includes: a processor and a transceiver, where the transceiver is configured to interact with a base station; and the processor is configured to receive, by using the transceiver, a unicast signal sent by the base station, where the unicast signal is obtained by the base station by performing rate matching of the unicast signal according to a multicast/broadcast single frequency network reference signal MBSFN RS; and perform rate de-matching of the unicast signal according to the MBSFN RS when receiving the unicast signal by using the transceiver.

With reference to the second aspect, in a first possible implementation manner of the second aspect, the processor is further configured to receive, by using the transceiver, downlink control information DCI sent by the base station, where the DCI is used to instruct the UE to perform rate de-matching and receive the transmitted unicast signal according to the MBSFN RS.

With reference to the second aspect, in a second possible implementation manner of the second aspect, a subframe in which the processor receives the unicast signal by using the transceiver includes one or more of: a cell-specific reference signal CRS, a channel state information-reference signal CSI-RS, a channel state information-interference measurement resource CSI-IMR, a demodulation reference signal DMRS, or a positioning reference signal PRS.

With reference to the second aspect or the first or the second possible implementation manner of the second aspect, in a third possible implementation manner of the second aspect, when the processor is further configured to receive, by using the transceiver, the unicast signal sent by the base station, a first RE or an RE group in an RE corresponding to a pilot signal used to demodulate the unicast signal is not used to demodulate the unicast signal.

With reference to the third possible implementation manner of the second aspect, in a fourth possible implementation manner of the second aspect, the first RE or the RE group is specifically:

an RE or an RE group or a subset of an RE group on which a demodulation pilot corresponding to the unicast signal is overlapped with the MBSFN RS, or an RE or an RE group that is predefined or that is configured by higher layer signaling, and the processor is configured to avoid using, according to the control signaling, the first RE or the RE group to demodulate the unicast signal.

According to a third aspect, the present invention further provides a signal transmission method, where the method includes:

performing, by the base station, rate matching of a unicast signal according to a multicast/broadcast single frequency network reference signal MBSFN RS; and sending, by the base station, the unicast signal to user equipment UE.

With reference to the third aspect, in a first possible implementation manner of the third aspect, the method further includes:

sending, by the base station, downlink control information DCI to the UE, where the DCI is used to instruct the UE to perform rate de-matching and receive the unicast signal according to the MBSFN RS.

With reference to the third aspect, in a second possible implementation manner of the third aspect, a subframe in which the base station sends the unicast signal includes one or more of: a cell-specific reference signal CRS, a channel state information-reference signal CSI-RS, a channel state information-interference measurement resource CSI-IMR, a demodulation reference signal DMRS, or a positioning reference signal PRS.

With reference to the third aspect or the first or the second possible implementation manner of the third aspect, in a third possible implementation manner of the third aspect, the method further includes:

sending, by the base station, control signaling to the UE, where the control signaling is used to indicate that a first RE or an RE group in an RE corresponding to a pilot signal used to demodulate the unicast signal is not used to demodulate the unicast signal.

With reference to the third possible implementation manner of the third aspect, in a fourth possible implementation manner of the third aspect, the first RE or the RE group is specifically:

an RE or an RE group or a subset of an RE group on which a demodulation pilot corresponding to the unicast signal is overlapped with the MBSFN RS, or an RE or an RE group that is predefined or that is configured by higher layer signaling.

According to a fourth aspect, the present invention further provides a signal transmission method, where the method includes:

receiving, by user equipment UE, a unicast signal sent by a base station, where the unicast signal is obtained by the base station by performing rate matching of the unicast signal according to a multicast/broadcast single frequency network reference signal MBSFN RS; and performing, by the UE, rate de-matching of the unicast signal according to the MBSFN RS when receiving the unicast signal.

With reference to the fourth aspect, in a first possible implementation manner of the fourth aspect, the method further includes:

receiving, by the UE, downlink control information DCI sent by the base station, where the DCI is used to instruct the UE to perform rate de-matching and receive the unicast signal according to the MBSFN RS.

With reference to the fourth aspect, in a second possible implementation manner of the fourth aspect, a subframe in which the UE receives the unicast signal includes one or more of: a cell-specific reference signal CRS, a channel state information-reference signal CSI-RS, a channel state information-interference measurement resource CSI-IMR, a demodulation reference signal DMRS, or a positioning reference signal PRS.

With reference to the fourth aspect or the first or the second possible implementation manner of the fourth aspect, in a third possible implementation manner of the fourth aspect, the method further includes:

when the UE receives the unicast signal, a first RE or an RE group in an RE corresponding to a pilot signal used to demodulate the unicast signal is not used to demodulate the unicast signal.

With reference to the third possible implementation manner of the fourth aspect, in a fourth possible implementation manner of the fourth aspect, the first RE or the RE group is specifically:

an RE or an RE group or a subset of an RE group on which a demodulation pilot corresponding to the unicast signal is overlapped with the MBSFN RS, or an RE or an RE group that is predefined or that is configured by higher layer signaling.

According to a fifth aspect, the present invention further provides a base station, where the base station includes: a processing unit and a sending unit, where the processing unit is configured to perform rate matching of a unicast signal according to a multicast/broadcast single frequency network reference signal MBSFN RS; and the sending unit is configured to send the unicast signal to user equipment UE.

With reference to the fifth aspect, in a first possible implementation manner of the fifth aspect, the sending unit is further configured to send downlink control information DCI to the UE, where the DCI is used to instruct the UE to perform rate de-matching and receive the unicast signal according to the MBSFN RS.

With reference to the fifth aspect, in a second possible implementation manner of the fifth aspect, a subframe in which the sending unit sends the unicast signal includes one or more of: a cell-specific reference signal CRS, a channel state information-reference signal CSI-RS, a channel state information-interference measurement resource CSI-IMR, a demodulation reference signal DMRS, or a positioning reference signal PRS.

With reference to the fifth aspect or the first or the second possible implementation manner of the fifth aspect, in a third possible implementation manner of the fifth aspect, the sending unit is further configured to send control signaling to the UE, where the control signaling is used to indicate that a first RE or an RE group in an RE corresponding to a pilot signal used to demodulate the unicast signal is not used to demodulate the unicast signal.

With reference to the third possible implementation manner of the fifth aspect, in a fourth possible implementation manner of the fifth aspect, the first RE or the RE group is specifically:

an RE or an RE group or a subset of an RE group on which a demodulation pilot corresponding to the unicast signal is overlapped with the MBSFN RS, or an RE or an RE group that is predefined or that is configured by higher layer signaling.

According to a sixth aspect, the present invention further provides user equipment, where the user equipment includes: a receiving unit and a processing unit, where the receiving unit is configured to receive a unicast signal sent by a base station, where the unicast signal is obtained by the base station by performing rate matching of the unicast signal according to a multicast/broadcast single frequency network reference signal MBSFN RS; and the processing unit is configured to perform rate de-matching of the unicast signal according to the MBSFN RS when the receiving unit receives the unicast signal.

With reference to the sixth aspect, in a first possible implementation manner of the sixth aspect, the receiving unit is further configured to receive downlink control information DCI sent by the base station, where the DCI is used to instruct the UE to perform rate de-matching and receive the unicast signal according to the MBSFN RS; and the processing unit is further configured to perform rate de-matching and receive the unicast signal according to the MBSFN RS.

With reference to the sixth aspect, in a second possible implementation manner of the sixth aspect, a subframe in which the receiving unit receives the unicast signal includes one or more of: a cell-specific reference signal CRS, a channel state information-reference signal CSI-RS, a channel state information-interference measurement resource CSI-IMR, a demodulation reference signal DMRS, or a positioning reference signal PRS.

With reference to the sixth aspect or the first or the second possible implementation manner of the sixth aspect, in a third possible implementation manner of the sixth aspect, the processing unit is further configured to: when the receiving unit receives the unicast signal, a first RE or an RE group in an RE corresponding to a pilot signal used to demodulate the unicast signal is not used to demodulate the unicast signal.

With reference to the third possible implementation manner of the sixth aspect, in a fourth possible implementation manner of the sixth aspect, the first RE or the RE group is specifically:

an RE or an RE group or a subset of an RE group on which a demodulation pilot corresponding to the unicast signal is overlapped with the MBSFN RS, or an RE or an RE group that is predefined or that is configured by higher layer signaling.

According to the signal transmission method and the apparatus provided in the present invention, a base station instructs UE to perform rate de-matching and receive a unicast signal in at least one MBSFN subframe according to an MBSFN RS, and an RE is not used to transmit the unicast signal, thereby more properly using MBSFN subframe resources, increasing resource usage, and ensuring continuity and effectiveness of performing broadcast multicast related measurement by the UE.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. apparently, the described embodiments are merely a part rather than all of the embodiments of the present invention. All other embodiments obtained by a person of ordinary skill in the art based on the embodiments of the present invention without creative efforts shall fall within the protection scope of the present invention.

A signal transmission method and an apparatus provided in the embodiments of the present invention may be applied to a wireless network of a broadcast multicast communications system, and are particularly applicable to a case in which simultaneous transmission of a unicast service and a multicast service exists, for example, a multicast/broadcast single frequency network system in which transmission is performed in an MBSFN manner.

Figure 1:
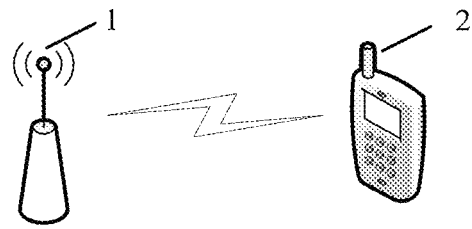
FIG. 1 is a schematic diagram of a system architecture of a broadcast multicast communications system according to an embodiment of the present invention.

FIG. 1 is a schematic diagram of a system architecture of a broadcast multicast communications system according to an embodiment of the present invention. As shown in FIG. 1, the system includes: a base station 1 and user equipment (UE) 2. The base station 1 sends downlink control information (Downlink Control Information, DCI) and a unicast or multicast signal to the UE 2. The UE 2 receives, according to the DCI, the unicast or multicast signal sent by the base station 1, and performs demodulation processing. The base station 1 may be an evolved NodeB eNodeB, a radio base station NodeB, a radio network controller RNC, a relay node (Relay NodeB, RN), or the like.

Figure 2:
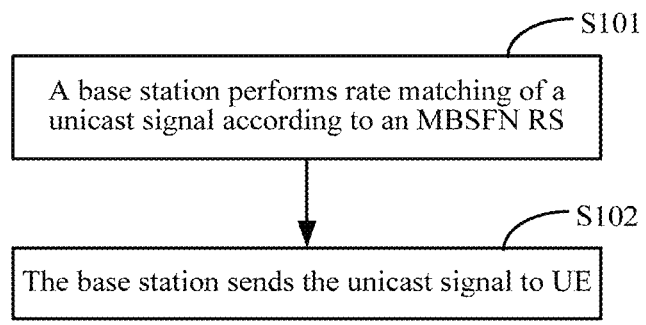
FIG. 2 is a flowchart of a signal transmission method according to an embodiment of the present invention.

FIG. 2 is a flowchart of a signal transmission method according to an embodiment of the present invention. As shown in FIG. 2, the signal transmission method in this embodiment of the present invention includes:

S101: A base station performs rate matching of a unicast signal according to an MBSFN RS.

In a communication process, when a physical layer signal is generated, a quantity of resource elements (Resource Element, RE) that may be used to transmit the physical layer signal needs to be determined. In this case, an RE that cannot be used to transmit the physical layer signal, and an RE that may be used to transmit the physical layer signal need to be determined, so that a quantity of data units that are mapped to a transmission resource after modulation and coding and that are included in the physical layer signal is determined according to the quantity of REs. The quantity of data units need to match the quantity of REs, and the matching process is referred to as rate matching.

The base station performs rate matching of the unicast signal according to the MBSFN RS, which may be understood as that a resource element RE corresponding to the MBSFN RS is not used to transmit the unicast signal. The base station determines, according to the MBSFN RS, a resource element used to transmit the unicast signal, that is, performs resource mapping, and allocates, in a data frame, the resource element used to transmit the unicast signal.

Preferably, in at least one MBSFN subframe, the base station performs rate matching of the unicast signal according to the MBSFN RS.

S102: The base station sends the unicast signal to user equipment UE.

In a reserved MBSFN subframe, the UE that is interested in an MBMS service performs MBSFN RS related measurement, so that the MBSFN RS absolutely needs to be transmitted in a corresponding subframe. In an MBMS communications system, some UEs are UEs that are interested in the MBMS service, for the UEs, because the UEs may know in advance that which subframe is an MBSFN subframe, and know that there is an MBSFN RS in the MBSFN subframe, and the UEs may perform MBSFN related measurement by using the MBSFN RS, for example, an M-RSSI (MBMS-Received Signal Strength Indicator, MBMS-received signal strength indicator). Therefore, when the base station does not receive the MBSFN service transmitted in the reserved MBSFN subframe due to network congestion or other reasons, the base station may directly schedule and send the unicast signal to the UEs, and the UEs may perform rate de-matching and receive the unicast signal according to the MBSFN RS. The unicast signal includes transmitted unicast data. Therefore, resource usage is increased, and continuity and effectiveness of performing broadcast multicast related measurement by the UE can be ensured. In this case, if the base station also transmits DCI, the DCI may use an existing DCI format.

For other UEs, if the other UEs are not interested in the MBMS service, the other UEs may do not know in advance whether there are an MBSFN RS and a unicast signal in the MBSFN subframe of the base station. In this case, optionally, the base station may further dynamically send downlink control information DCI to the UEs.

The DCI is used to instruct the UE to perform rate de-matching and receive the unicast signal according to the MBSFN RS. Preferably, the DCI is used to instruct the UE to perform rate de-matching and receive the unicast signal in the at least one MBSFN subframe according to the MBSFN RS. Therefore, resource usage is increased, and continuity and effectiveness of performing broadcast multicast related measurement by the UE performing MBMS measurement can be ensured.

Optionally, the DCI is used to indicate that a resource element RE corresponding to the MBSFN RS is not used to transmit the unicast signal. Preferably, the DCI is used to indicate that a resource element RE corresponding to an MBSFN RS in the at least one MBSFN subframe is not used to transmit the unicast signal.

Figure 4A:
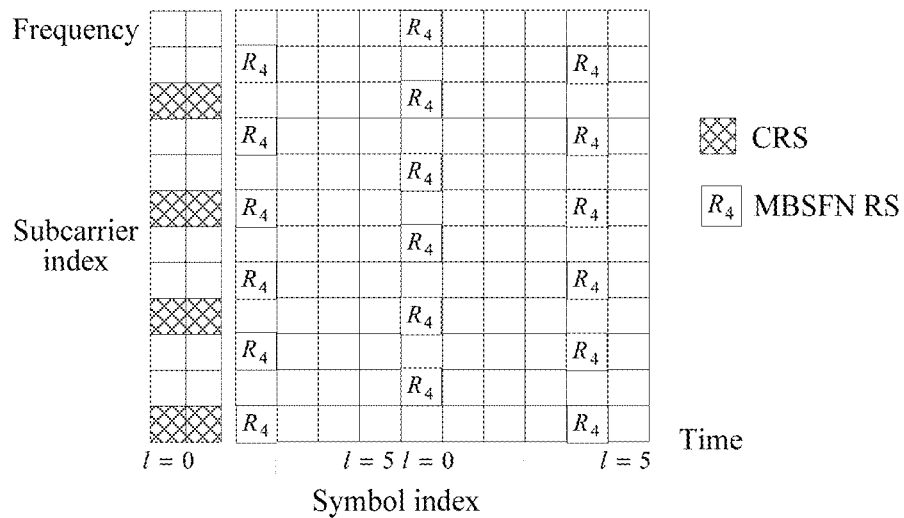
FIG. 4*a* is a schematic diagram of a resource element of a data frame according to an embodiment of the present invention.

For example, in a broadcast multicast communications system, the base station sends the DCI to the UE, and the DCI is used to instruct the UE to receive, in an MBSFN subframe scheduled by the DCI, data of unicast transmission. The DCI includes downlink resource scheduling information. Specifically, as shown in FIG. 4a, in FIG. 4a, a lateral axis represents time, 1=0 to 5 represents a symbol index, a vertical axis represents a frequency, corresponding to a subcarrier index, each lateral axis intersects with the vertical axis, an intersection portion is a block, and each block represents an RE. FIG. 4a includes an RE transmitting an MBSFN RS, an RE transmitting a cell-specific reference signal (Cell-specific Reference Signal, CRS), and an RE (blank) transmitting data.

In an existing transmission process, on the one hand, if the base station does not receive, from a network site, any signal that needs to be transmitted in a reserved MBSFN subframe, the subframe is idle and has no MBMS service to transmit; as a result, resource usage is low. On the other hand, if no MBSFN RS is transmitted in a subframe in which the UE receives the MBMS service, the unicast signal is transmitted in the subframe. In this case, the UE receiving the MBMS service still performs MBSFN related measurement in the subframe based on the MBSFN RS, but there is no MBSFN RS in the subframe, which causes only incorrect measurement results, affects accuracy of an MBMS measurement result and effectiveness of performing subsequent processing according to the measurement results.

Therefore, according to the signal transmission method provided in this embodiment of the present invention, a base station performs rate matching of a unicast signal according to an MBSFN RS, so that the base station may transmit the unicast signal by using an idle MBSFN subframe, thereby increasing resource usage. For uninterested UE, the base station may further instruct, by using DCI, the UE to perform rate de-matching and receive the unicast signal in the at least one MBSFN subframe according to the MBSFN RS, which can avoid an idle subframe and increase resource usage. In addition, the MBSFN RS may always be transmitted in the MBSFN subframe that needs to be measured by the UE, so that the UE performs MBSFN related measurement, thereby ensuring continuity and effectiveness of performing broadcast multicast related measurement by the UE. The base station instructs, by using the DCI, the UE to perform rate de-matching and receive the unicast signal according to the MBSFN RS. In this way, the UE is completely controlled by the base station to perform rate de-matching processing of unicast signal transmission, so as to be consistent with processing of the base station and correctly receive a unicast signal.

Optionally, the subframe in which the base station sends the unicast signal may further include one or more of: a cell-specific reference signal (Cell-specific Reference Signal, CRS), a channel state information-reference signal (Channel State Information-Reference Signal, CSI-RS), a channel state information-interference measurement resource (Channel State Information-Interference Measurement Resource, CSI-IMR), a demodulation reference signal (Demodulation Reference Signal, DMRS), or a positioning reference signal (Positioning Reference Signal, PRS).

Preferably, the base station may send control signaling to the UE, to indicate that the subframe in which the unicast signal is transmitted may further include one or more of: a cell-specific reference signal CRS, a channel state information-reference signal CSI-RS, a channel state information-interference measurement resource CSI-IMR, a demodulation reference signal DMRS, or a positioning reference signal PRS. The control signaling herein may be higher layer signaling (for example, RRC signaling) or DCI signaling.

An RE transmitting the CRS, the CSI-RS, the CSI-IM, the DMRS, and the PRS is not used to transmit the unicast signal, so that the base station and the UE need to perform corresponding rate matching and rate de-matching. Therefore, the signals may be transmitted in the MBSFN subframe, for measurement by the UE, and the rate matching and the rate de-matching are accurate.

The subframe in which the unicast signal is transmitted is at least one MBSFN subframe. Alternatively, the subframe in which the unicast signal is transmitted may be any subframe in which the UE assumes that an MBSFN RS is transmitted.

Optionally, the method further includes: sending, by the base station, control signaling to the UE, where the control signaling is used to indicate that a first RE or an RE group in an RE corresponding to a pilot signal used to demodulate the unicast signal is not used to demodulate the unicast signal. Certainly, the base station may not send the control signaling used for indication. The first RE or the RE group is specifically: an RE or an RE group or a subset of an RE group on which a demodulation pilot corresponding to the unicast signal is overlapped with the MBSFN RS. The demodulation pilot may be a CRS or a DMRS. For example, the first RE or the RE group specifically includes one or more of the following: an RE or an RE group on which the CRS is overlapped with the MBSFN RS, an RE or an RE group on which the DMRS is overlapped with the MBSFN RS, or an RE or an RE group that is predefined or that is configured by higher layer signaling. Preferably, the control signaling, for example, DCI signaling or higher layer signaling (for example, RRC signaling) may be used to indicate that the first RE or the RE group is not used to demodulate the unicast signal. Correspondingly, when the UE receives the control signaling such as the DCI, according to the control signaling such as the DCI, the first RE or the RE group is not used to demodulate the unicast signal. Another manner is that N RE groups are predefined or configured by higher layer signaling, and an information unit in the DCI may indicate a specific RE group that is not used to demodulate a signal of unicast transmission. Therefore, completeness of the MBSFN RS is ensured, accuracy and effectiveness of MBSFN RS related measurement are ensured, and the UE receiving the unicast signal can also demodulate the unicast signal according to an actual demodulation pilot.

Figure 4B:
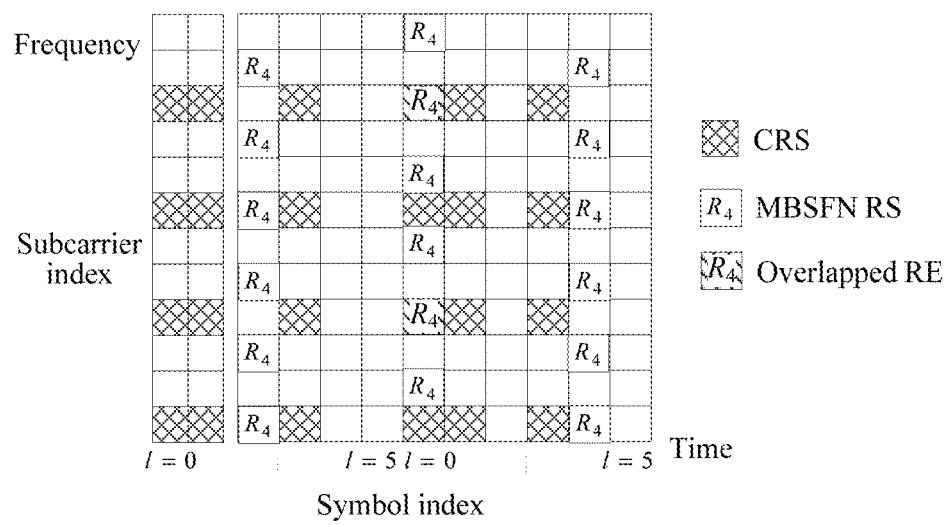
FIG. 4*b* is a schematic diagram of a resource element performing demodulation by using a CRS according to an embodiment of the present invention.

Optionally, if the MBSFN subframe includes the CRS, the DCI is further configured to indicate that the RE or the RE group on which the CRS is overlapped with the MBSFN RS is not used to demodulate the unicast signal, so that the UE uses the CRS to demodulate the unicast signal. Specifically, as shown in FIG. 4b, each block in FIG. 4b represents an RE, except a control area (for example, first two symbols), including: an RE transmitting the MBSFN RS, an RE transmitting the CRS, an RE (blank) transmitting data, and an RE on which the CRS is overlapped with the MBSFN RS. The RE on which the CRS is overlapped with the MBSFN RS is not used to demodulate the unicast signal.

Figure 4C:
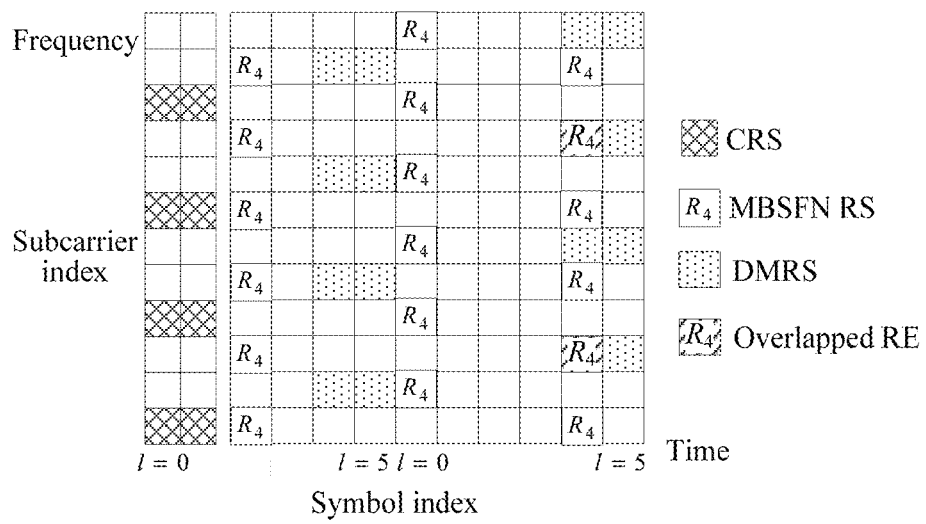
FIG. 4*c* is a schematic diagram of a resource element performing demodulation by using a DMRS according to an embodiment of the present invention.

Optionally, if the MBSFN subframe includes the DMRS, the DCI is further used to indicate that the RE or the RE group on which the DMRS is overlapped with the MBSFN RS is not used to demodulate the unicast signal, so that the UE uses the DMRS to demodulate the unicast signal. Specifically, as shown in FIG. 4c, each block in FIG. 4c represents an RE, except a control area (for example, first two symbols), including: an RE transmitting the MBSFN RS, an RE transmitting the CRS, an RE transmitting the DMRS, an RE (blank) transmitting data, and an RE on which the DMRS is overlapped with the MBSFN RS. The RE on which the DMRS is overlapped with the MBSFN RS is not used to demodulate the unicast signal.

The DCI may be transmitted by using a physical downlink control channel (Physical Downlink Control Channel, PDCCH) or an enhanced physical downlink control channel (enhanced Physical Downlink Control Channel, ePDCCH).

Optionally, the DCI that is used to indicate unicast transmission in the MBSFN subframe may be predefined to be used to instruct the UE to perform rate de-matching and receive the unicast signal according to the MBSFN RS. In this case, the DCI may use an existing DCI format.

Alternatively, a new DCI format may also be used to indicate the foregoing information. For example, scrambled DCI corresponding to a unicast-radio network temporary identifier (Unicast-Radio Network Temporary Identifier, U-RNTI) is defined, where the U-RNTI is dedicated to the new DCI format, or DCI having new content or having a new information composition manner is defined. Optionally, some composition information units in the existing DCI may be reused to perform the foregoing indication. Optionally, a new information unit may be added to the existing DCI to perform the foregoing indication. For example, a bit is added, when the bit is 1, it indicates that the subframe has an MBSFN RS, and an RE on which the MBSFN RS is overlapped is not used to demodulate the signal of unicast transmission, and when the bit is 0, the indication is opposite. When the new DCI is used, the new DCI may be limited to being used in only the MBSFN subframe.

Figure 3:
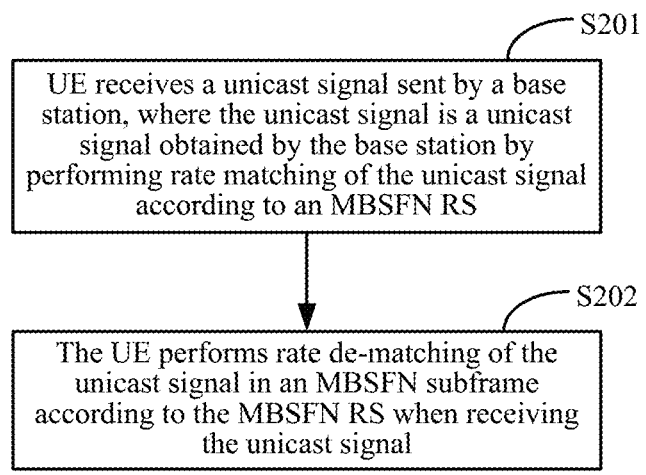
FIG. 3 is a flowchart of another signal transmission method according to an embodiment of the present invention.

Corresponding to the embodiment corresponding to FIG. 2, FIG. 3 is a flowchart of another signal transmission method according to an embodiment of the present invention. As shown in FIG. 3, the signal transmission method in this embodiment of the present invention includes:

S201: UE receives a unicast signal sent by a base station.

The unicast signal is obtained by the base station by performing rate matching of the unicast signal according to an MBSFN RS, which may be understood as that a resource element RE corresponding to the MBSFN RS is not used to transmit the unicast signal. The base station determines, according to the MBSFN RS, a resource element used to transmit the unicast signal, that is, performs resource mapping, and allocates, in a data subframe, the resource element used to transmit the unicast signal.

Preferably, in at least one MBSFN subframe, the base station performs rate matching of the unicast signal according to the MBSFN RS.

S202: The UE performs rate de-matching of the unicast signal according to the MBSFN RS when receiving the unicast signal.

Rate de-matching at a UE side is an opposite process to rate matching at a base station side, and the UE performs rate de-matching of the unicast signal according to the MBSFN RS.

Preferably, in the at least one MBSFN subframe, the UE performs rate de-matching of the unicast signal according to the MBSFN RS.

The subframe in which the UE receives the unicast signal is at least one MBSFN subframe. Alternatively, the subframe in which the UE receives the unicast signal may be any subframe in which the UE assumes that an MBSFN RS is transmitted.

In a reserved MBSFN subframe, the UE that is interested in an MBMS service performs MBSFN RS related measurement, so that the MBSFN RS absolutely needs to be transmitted in a corresponding subframe. In an MBMS communications system, some UEs are UEs that are interested in the MBMS service, for the UEs, because the UEs may know in advance that which subframe is an MBSFN subframe, and know that there is an MBSFN RS in the MBSFN subframe, and the UEs may perform MBSFN related measurement by using the MBSFN RS, for example, an M-RSSI (MBMS-Received Signal Strength Indicator, MBMS-received signal strength indicator). Therefore, when the base station does not receive the MBSFN service transmitted in the reserved MBSFN subframe due to network congestion or other reasons, the base station may directly schedule and send the unicast signal to the UEs, and the UEs may perform rate de-matching and receive the unicast signal according to the MBSFN RS. The unicast signal includes transmitted unicast data. Therefore, resource usage is increased, and continuity and effectiveness of performing broadcast multicast related measurement by the UE can be ensured. The base station may further dynamically send downlink control information DCI to the UE, so that some UEs that are not interested in the MBMS service cannot know in advance whether the transmitted MBMS service includes the MBSFN RS. In this case, correspondingly, the method further includes: receiving, by the UE, the DCI sent by the base station.

The DCI is used to instruct the UE to perform rate de-matching and receive the transmitted unicast signal according to the MBSFN RS. Preferably, the DCI is further used to instruct the UE to perform rate de-matching and receive the unicast signal in the at least one MBSFN subframe according to the MBSFN RS.

Therefore, resource usage is increased, and continuity and effectiveness of performing broadcast multicast related measurement by the UE performing MBMS measurement can be ensured.

Optionally, the DCI is used to indicate that a resource element RE corresponding to the MBSFN RS is not used to transmit the unicast signal. Preferably, the DCI is used to indicate that a resource element RE corresponding to an MBSFN RS in the at least one MBSFN subframe is not used to transmit the unicast signal.

In this way, even if the UE does not know in advance that the transmitted MBMS service has the MBSFN RS, the UE may also perform rate de-matching of the unicast signal according to the MBSFN RS when receiving the unicast signal.

Optionally, the subframe in which the UE receives the unicast signal may further include one or more of: a cell-specific reference signal (Cell-specific Reference Signal, CRS), a channel state information-reference signal (Channel State Information-Reference Signal, CSI-RS), a channel state information-interference measurement resource (Channel State Information-Interference Measurement Resource, CSI-IMR), a demodulation reference signal (Demodulation Reference Signal, DMRS), or a positioning reference signal (Positioning Reference Signal, PRS).

Preferably, the UE may receive control signaling sent by the base station, where the control signaling is used to indicate that the subframe in which the unicast signal is transmitted may further include one or more of: a cell-specific reference signal CRS, a channel state information-reference signal CSI-RS, a channel state information-interference measurement resource CSI-IMR, a demodulation reference signal DMRS, or a positioning reference signal PRS. The control signaling herein may be higher layer signaling (for example, RRC signaling) or DCI signaling.

An RE transmitting the CRS, the CSI-RS, the CSI-IM, the DMRS, and the PRS is not used to transmit the unicast signal, so that the base station and the UE need to perform corresponding rate matching and rate de-matching. Therefore, the signals may be transmitted in the MBSFN subframe, for measurement by the UE, and the rate matching and the rate de-matching are accurate.

Optionally, the method further includes: when the UE receives the unicast signal, a first RE or an RE group in an RE corresponding to a pilot signal used to demodulate the unicast signal is not used to demodulate the unicast signal. The first RE or the RE group is specifically: an RE or an RE group or a subset of an RE group on which a demodulation pilot corresponding to the unicast signal is overlapped with the MBSFN RS. The demodulation pilot may be a CRS or a DMRS. For example, the first RE or the RE group specifically includes one or more of the following: an RE or an RE group on which the CRS is overlapped with the MBSFN RS, an RE or an RE group on which the DMRS is overlapped with the MBSFN RS, or an RE or an RE group that is predefined or that is configured by higher layer signaling. Preferably, the control signaling, for example, DCI signaling or higher layer signaling (for example, RRC signaling) may be used to indicate that the first RE or the RE group is not used to demodulate the unicast signal. Correspondingly, when the UE receives the control signaling such as the DCI, according to the control signaling such as the DCI, the first RE or the RE group is not used to demodulate the unicast signal. Another manner is that N RE groups are predefined or configured by higher layer signaling, and an information unit in the DCI may indicate a specific RE group that is not used to demodulate a signal of unicast transmission.

Therefore, completeness of the MBSFN RS is ensured, accuracy and effectiveness of MBSFN RS related measurement are ensured, and the UE receiving the unicast signal can also demodulate the unicast signal according to an actual demodulation pilot.

For example, if the subframe in which the unicast signal is sent includes the CRS, after S202, the method further includes: demodulating, by the UE, the unicast signal by using the CRS according to the DCI (the control signaling), where the RE or the RE group on which the CRS is overlapped with the MBSFN RS is not used to demodulate the unicast signal.

For example, if the subframe in which the unicast signal is sent includes the DMRS, after S202, the method further includes: demodulating, by the UE, the unicast signal by using the DMRS according to the DCI, where the RE or the RE group on which the DMRS is overlapped with the MBSFN RS is not used to demodulate the unicast signal.

It should be noted that, in the foregoing two cases, the DCI that is sent by the base station and that is received by the UE may not indicate that the RE or the RE group in which the CRS or the DMRS in the MBSFN subframe is overlapped with the MBSFN RS is not used to demodulate the unicast signal. The control signaling (for example, DCI or RRC signaling) that is sent by the base station and that is received by the UE may also indicate that the RE or the RE group on which the CRS or the DMRS in the MBSFN subframe is overlapped with the MBSFN RS is not used to demodulate the unicast signal.

According to the signal transmission method provided in this embodiment of the present invention, UE performs rate de-matching and receives a unicast signal in at least one MBSFN subframe according to an MBSFN RS, so that the UE may perform effective measurement based on the MBSFN RS, continuity and effectiveness of performing broadcast multicast related measurement by the UE are ensured, MBSFN subframe resources are more properly used, and resource usage is increased. Particularly, the UE receives an indication of a base station, according to the indication, the UE performs rate de-matching and receives the unicast signal in the at least one MBSFN subframe according to the MBSFN RS, an RE that is not used to transmit the unicast signal is indicated, and the UE may determine a subframe in which MBSFN related measurement needs to be performed, and a subframe in which MBSFN related measurement does not need to be performed, thereby more properly using MBSFN subframe resources, increasing resource usage, and ensuring continuity and effectiveness of performing broadcast multicast related measurement by the UE.

Figure 5:
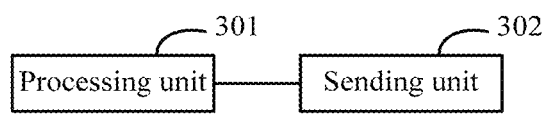
FIG. 5 is a schematic structural diagram of a base station according to an embodiment of the present invention.

FIG. 5 is a schematic structural diagram of a base station according to an embodiment of the present invention. As shown in FIG. 5, the base station in this embodiment of the present invention includes: a processing unit 301 and a sending unit 302.

The processing unit 301 is configured to perform rate matching of a unicast signal according to an MBSFN RS.

In a communication process, when a physical layer signal is generated, a quantity of resource elements (Resource Element, RE) that may be used to transmit the physical layer signal needs to be determined. In this case, an RE that cannot be used to transmit the physical layer signal, and an RE that may be used to transmit the physical layer signal need to be determined, so that a quantity of data units that are mapped to a transmission resource after modulation and coding and that are included in the physical layer signal is determined according to the quantity of REs. The quantity of data units need to match the quantity of REs, and the matching process is referred to as rate matching.

The processing unit 301 performs rate matching of the unicast signal according to the MBSFN RS, which may be understood as that a resource element RE corresponding to the MBSFN RS is not used to transmit the unicast signal. The processing unit 301 determines, according to the MBSFN RS, a resource element used to transmit the unicast signal, that is, performs resource mapping, and allocates, in a data frame, the resource element used to transmit the unicast signal.

Preferably, in at least one MBSFN subframe, the processing unit 301 performs rate matching of the unicast signal according to the MBSFN RS.

The sending unit 302 is configured to send the unicast signal to the UE.

In a reserved MBSFN subframe, the UE that is interested in an MBMS service performs MBSFN RS related measurement, so that the MBSFN RS absolutely needs to be transmitted in a corresponding subframe. In an MBMS communications system, some UEs are UEs that are interested in the MBMS service, for the UEs, because the UEs may know in advance that which subframe is an MBSFN subframe, and know that there is an MBSFN RS in the MBSFN subframe, and the UEs may perform MBSFN related measurement by using the MBSFN RS, for example, an M-RSSI (MBMS-Received Signal Strength Indicator, MBMS-received signal strength indicator). Therefore, when the base station does not receive the MBMS service transmitted in the reserved MBSFN subframe due to network congestion or other reasons, the sending unit 302 may directly schedule and send the unicast signal to the UEs, and the UEs may perform rate de-matching and receive the unicast signal according to the MBSFN RS. The unicast signal includes transmitted unicast data. Therefore, resource usage is increased, and continuity and effectiveness of performing broadcast multicast related measurement by the UE can be ensured. In this case, if the base station also transmits downlink control information DCI, the DCI may use an existing DCI format.

For other UEs, if the other UEs are not interested in the MBMS service, the other UEs may not know in advance whether there are an MBSFN RS and a unicast signal in the MBSFN subframe of the base station. In this case, optionally, the sending unit 302 may further dynamically send DCI to the UEs.

The DCI is used to instruct the UE to perform rate de-matching and receive the unicast signal according to the MBSFN RS. Preferably, the DCI is used to instruct the UE to perform rate de-matching and receive the unicast signal in the at least one MBSFN subframe according to the MBSFN RS. Therefore, resource usage is increased, and continuity and effectiveness of performing broadcast multicast related measurement by the UE performing MBMS measurement can be ensured.

For example, in a broadcast multicast communications system, the base station sends the DCI to the UE by using the sending unit 302, and the DCI is used to instruct the UE to receive, in an MBSFN subframe scheduled by the DCI, unicast transmitted data. The DCI includes downlink resource scheduling information. Specifically, as shown in FIG. 4a, in FIG. 4a, a lateral axis represents time, 1=0 to 5 represents a symbol index, a vertical axis represents a frequency, corresponding to a subcarrier index, each lateral axis intersects with the vertical axis, an intersection portion is a block, and each block represents an RE. FIG. 4a includes an RE transmitting an MBSFN RS, an RE transmitting a CRS, and an RE (blank) transmitting data.

The base station provided in this embodiment of the present invention performs rate matching of a unicast signal according to an MBSFN RS, and may transmit the unicast signal by using an idle MBSFN subframe, thereby increasing resource usage. For uninterested UE, the base station may further send DCI by using the sending unit 302, and may instruct the UE to perform rate de-matching and receive the unicast signal in at least one MBSFN subframe according to the MBSFN RS, which may avoid an idle subframe and increase resource usage. In addition, the MBSFN RS may always be transmitted in the MBSFN subframe that needs to be measured by the UE, so that the UE performs MBSFN related measurement, thereby ensuring continuity and effectiveness of performing broadcast multicast related measurement by the UE. The base station instructs, by using the DCI, the UE to perform rate de-matching and receive the unicast signal according to the MBSFN RS. In this way, the UE is completely controlled by the base station to perform rate de-matching processing of unicast signal transmission, so as to be consistent with processing of the base station and correctly receive a unicast signal.

Optionally, the subframe in which the sending unit 302 sends the unicast signal may further include one or more of: a cell-specific reference signal CRS, a channel state information-reference signal CSI-RS, a channel state information-interference measurement resource CSI-IMR, a demodulation reference signal DMRS, or a positioning reference signal PRS.

Preferably, the sending unit 302 may send control signaling to the UE, to indicate that the subframe in which the unicast signal is transmitted may further include one or more of: a cell-specific reference signal CRS, a channel state information-reference signal CSI-RS, a channel state information-interference measurement resource CSI-IMR, a demodulation reference signal DMRS, or a positioning reference signal PRS. The control signaling herein may be higher layer signaling (for example, RRC signaling) or DCI signaling.

The subframe in which the unicast signal is transmitted is at least one MBSFN subframe. Alternatively, the subframe in which the unicast signal is transmitted may be any subframe in which the UE assumes that an MBSFN RS is transmitted.

AN RE transmitting the CRS, the CSI-RS, the CSI-IM, the DMRS, and the PRS is not used to transmit the unicast signal, so that the base station and the UE need to perform corresponding rate matching and rate de-matching. Therefore, the signals may be transmitted in the MBSFN subframe, for measurement by the UE, and the rate matching and the rate de-matching are accurate.

Optionally, the control signaling sent by the sending unit 302 further includes indication information used to indicate that a first RE or an RE group in an RE corresponding to a pilot signal used to demodulate the unicast signal is not used to demodulate the unicast signal. The first RE or the RE group is specifically: an RE or an RE group or a subset of an RE group on which a demodulation pilot corresponding to the unicast signal is overlapped with the MBSFN RS. The demodulation pilot may be a CRS or a DMRS. For example, the first RE or the RE group specifically includes one or more of the following: an RE or an RE group on which the CRS is overlapped with the MBSFN RS, an RE or an RE group on which the DMRS is overlapped with the MBSFN RS, or an RE or an RE group that is predefined or that is configured by higher layer signaling. Preferably, the control signaling, for example, DCI signaling or higher layer signaling (for example, RRC signaling) may be used to indicate that the first RE or the RE group is not used to demodulate the unicast signal. Correspondingly, when the UE receives the control signaling such as the DCI, according to the control signaling such as the DCI, the first RE or the RE group is not used to demodulate the unicast signal. Another manner is that N RE groups are predefined or configured by higher layer signaling, and an information unit in the DCI may indicate a specific RE group that is not used to demodulate a signal of unicast transmission. Therefore, completeness of the MBSFN RS is ensured, accuracy and effectiveness of MBSFN RS related measurement are ensured, and the UE receiving the unicast signal can also demodulate the unicast signal according to an actual demodulation pilot.

Optionally, if the MBSFN subframe includes the CRS, the DCI sent by the sending unit 302 may be further used to indicate that the RE or the RE group on which the CRS is overlapped with the MBSFN RS is not used to demodulate the unicast signal, so that the UE uses the CRS to demodulate the unicast signal. Specifically, as shown in FIG. 4b, the RE on which the CRS is overlapped with the MBSFN RS is not used to demodulate the unicast signal.

Optionally, if the MBSFN subframe includes the DMRS, the DCI sent by the sending unit 302 may be further used to indicate that the RE or the RE group on which the DMRS is overlapped with the MBSFN RS is not used to demodulate the unicast signal, so that the UE uses the DMRS to demodulate the unicast signal. Specifically, as shown in FIG. 4c, the RE on which the DMRS is overlapped with the MBSFN RS is not used to demodulate the unicast signal.

The DCI sent by the sending unit 302 may be transmitted by using a PDCCH or an ePDCCH.

Optionally, the DCI that is used to indicate unicast transmission in the MBSFN subframe may be predefined to be used to instruct the UE to perform rate de-matching and receive the unicast signal according to the MBSFN RS. In this case, the DCI sent by the sending unit 302 may use an existing DCI format.

Alternatively, the DCI sent by the sending unit 302 may also use a new DCI format to indicate the foregoing information. For example, scrambled DCI corresponding to a U-RNTI is defined, where the U-RNTI is dedicated to the new DCI format, or DCI having new content or having a new information composition manner is defined. Optionally, some composition information units in the existing DCI may be reused to perform the foregoing indication. Optionally, a new information unit may be added to the existing DCI to perform the foregoing indication. For example, a bit is added, when the bit is 1, it indicates that the subframe has an MBSFN RS, and an RE on which the MBSFN RS is overlapped is not used to demodulate the signal of unicast transmission, and when the bit is 0, the indication is opposite. When the new DCI is used, the new DCI may be limited to being used in only the MBSFN subframe.

Figure 6:
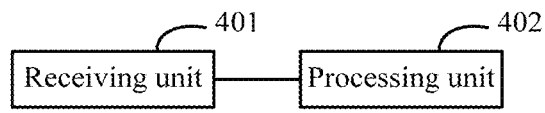
FIG. 6 is a schematic structural diagram of user equipment according to an embodiment of the present invention.

Corresponding to the embodiment corresponding to FIG. 5, FIG. 6 is a schematic structural diagram of user equipment according to an embodiment of the present invention. As shown in FIG. 6, user equipment in this embodiment of the present invention includes: a receiving unit 401 and a processing unit 402.

The receiving unit 401 is configured to receive a unicast signal sent by a base station.

The unicast signal is obtained by the base station by performing rate matching of the unicast signal according to an MBSFN RS, which may be understood as that a resource element RE corresponding to the MBSFN RS is not used to transmit the unicast signal. The base station determines, according to the MBSFN RS, a resource element used to transmit the unicast signal, that is, performs resource mapping, and allocates, in a data subframe, the resource element used to transmit the unicast signal.

Preferably, in at least one MBSFN subframe, the base station performs rate matching of the unicast signal according to the MBSFN RS.

The processing unit 402 is configured to perform rate de-matching of the unicast signal according to the MBSFN RS when the receiving unit 401 receives the unicast signal.

Preferably, in at least one MBSFN subframe, the processing unit 402 performs rate de-matching of the unicast signal according to the MBSFN RS.

The subframe in which the receiving unit 401 receives the unicast signal is at least one MBSFN subframe. Alternatively, the subframe in which the receiving unit 401 receives the unicast signal may be any subframe in which the UE assumes that the MBSFN RS is transmitted.

In a reserved MBSFN subframe, the UE that is interested in an MBMS service performs MBSFN RS related measurement, so that the MBSFN RS absolutely needs to be transmitted in a corresponding subframe. In an MBMS communications system, some UEs are UEs that are interested in the MBMS service, for the UEs, because the UEs may know in advance that which subframe is an MBSFN subframe, and know that there is an MBSFN RS in the MBSFN subframe, and the UEs may perform MBSFN related measurement by using the MBSFN RS, for example, an M-RSSI (MBMS-Received Signal Strength Indicator, MBMS-received signal strength indicator). Therefore, when the base station does not receive the MBSFN service transmitted in the reserved MBSFN subframe due to network congestion or other reasons, the base station may directly schedule and send the unicast signal to the UEs, and the UEs may perform rate de-matching and receive the unicast signal according to the MBSFN RS. The unicast signal includes transmitted unicast data. Therefore, resource usage is increased, and continuity and effectiveness of performing broadcast multicast related measurement by the UE can be ensured. The base station may further send downlink control information DCI to the UE, so that some UEs that are not interested in the MBMS service cannot know in advance whether the transmitted MBMS service includes the MBSFN RS. In this case, the receiving unit 401 is further configured to receive the DCI sent by the base station.

The DCI is used to instruct the UE to perform rate de-matching and receive the transmitted unicast signal according to the MBSFN reference signal MBSFN RS. Preferably, the DCI is further used to instruct the UE to perform rate de-matching and receive the unicast signal in the at least one MBSFN subframe according to the MBSFN RS. Therefore, resource usage is increased, and continuity and effectiveness of performing broadcast multicast related measurement by the UE performing MBMS measurement can be ensured.

Optionally, the DCI is used to indicate that a resource element RE corresponding to the MBSFN RS is not used to transmit the unicast signal. Preferably, the DCI is used to indicate that a resource element RE corresponding to an MBSFN RS in the at least one MBSFN subframe is not used to transmit the unicast signal.

In this way, even if the UE does not know in advance that the transmitted MBMS service has the MBSFN RS, the UE may also perform rate de-matching of the unicast signal according to the MBSFN RS when receiving the unicast signal.

Optionally, the subframe in which the UE receives the unicast signal may further include one or more of: a cell-specific reference signal CRS, a channel state information-reference signal CSI-RS, a channel state information-interference measurement resource CSI-IMR, a demodulation reference signal DMRS, or a positioning reference signal PRS.

Preferably, the receiving unit 401 may receive control signaling sent by the base station, to indicate that the subframe in which the unicast signal is transmitted may further include one or more of: a cell-specific reference signal CRS, a channel state information-reference signal CSI-RS, a channel state information-interference measurement resource CSI-IMR, a demodulation reference signal DMRS, or a positioning reference signal PRS. The control signaling herein may be higher layer signaling (for example, RRC signaling) or DCI signaling.

An RE transmitting the CRS, the CSI-RS, the CSI-IM, the DMRS, and the PRS is not used to transmit the unicast signal, so that the base station and the UE need to perform corresponding rate matching and rate de-matching. Therefore, the signals may be transmitted in the MBSFN subframe, for measurement by the UE, and the rate matching and the rate de-matching are accurate.

Optionally, the control signaling received by the receiving unit 401 further includes indication information used to indicate that a first RE or an RE group in an RE corresponding to a pilot signal used to demodulate the unicast signal is not used to demodulate the unicast signal. The first RE or the RE group is specifically: an RE or an RE group or a subset of an RE group on which a demodulation pilot corresponding to the unicast signal is overlapped with the MBSFN RS. The demodulation pilot may be a CRS or a DMRS. For example, the first RE or the RE group specifically includes one or more of the following: an RE or an RE group on which the CRS is overlapped with the MBSFN RS, an RE or an RE group on which the DMRS is overlapped with the MBSFN RS, or an RE or an RE group that is predefined or that is configured by higher layer signaling. Preferably, the control signaling, for example, DCI signaling or higher layer signaling (for example, RRC signaling) may be used to indicate that the first RE or the RE group is not used to demodulate the unicast signal. Correspondingly, when the UE receives the control signaling such as the DCI, according to the control signaling such as the DCI, the first RE or the RE group is not used to demodulate the unicast signal. Another manner is that N RE groups are predefined or configured by higher layer signaling, and an information unit in the DCI may indicate a specific RE group that is not used to demodulate a signal of unicast transmission.

Therefore, completeness of the MBSFN RS is ensured, accuracy and effectiveness of MBSFN RS related measurement are ensured, and the UE receiving the unicast signal can also demodulate the unicast signal according to an actual demodulation pilot.

For example, if the subframe in which the unicast signal is sent includes the CRS, the processing unit 402 is further configured to demodulate the unicast signal by using the CRS according to the DCI, where the RE or the RE group on which the CRS is overlapped with the MBSFN RS is not used to demodulate the unicast signal.

For example, if the subframe in which the unicast signal is sent includes the DMRS, the processing unit 402 is further configured to demodulate the unicast signal by using the DMRS according to the DCI, where the RE or the RE group on which the DMRS is overlapped with the MBSFN RS is not used to demodulate the unicast signal.

It should be noted that, in the foregoing two cases, a message (for example, the DCI) that is sent by the base station and that is received by the receiving unit 401 may not indicate that the RE or the RE group on which the CRS or the DMRS in the MBSFN subframe is overlapped with the MBSFN RS is not used to demodulate the unicast signal. The message that is sent by the base station and that is received by the receiving unit 401 may also indicate that the RE or the RE group on which the CRS or the DMRS in the MBSFN subframe is overlapped with the MBSFN RS is not used to demodulate the unicast signal.

Specifically, the base station may send control signaling to the UE, for example, DCI or RRC signaling, where the control signaling is used to indicate that a pilot signal that is used for demodulation and that corresponds to the first RE or the RE group is not used to demodulate the unicast signal. In this case, the receiving unit 401 is further configured to receive the control signaling sent by the base station.

The first RE or the RE group is specifically: an RE or an RE group or a subset of an RE group on which a demodulation pilot corresponding to the unicast signal is overlapped with the MBSFN RS, an RE or an RE group that is predefined or that is configured by higher layer signaling. The first RE or the RE group specifically includes one or more of the following: an RE or an RE group on which the CRS is overlapped with the MBSFN RS, an RE or an RE group on which the DMRS is overlapped with the MBSFN RS, or an RE or an RE group that is predefined or that is configured by higher layer signaling. In this case, according to the control signaling, the processing unit 402 does not use the first RE or the RE group to demodulate the unicast signal.

According to the base station and the UE provided in the embodiments of the present invention, the UE performs rate de-matching and receives the unicast signal in the at least one MBSFN subframe according to an MBSFN RS, so that the UE may perform effective measurement based on the MBSFN RS, continuity and effectiveness of performing broadcast multicast related measurement by the UE are ensured, MBSFN subframe resources are more properly used, and resource usage is increased. Particularly, the UE receives an indication of the base station, according to the indication, the UE performs rate de-matching and receives the unicast signal in the at least one MBSFN subframe according to the MBSFN RS, an RE that is not used to transmit the unicast signal is indicated, and the UE may determine a subframe in which MBSFN related measurement needs to be performed, and a subframe in which MBSFN related measurement does not need to be performed, thereby more properly using MBSFN subframe resources, increasing resource usage, and ensuring continuity and effectiveness of performing broadcast multicast related measurement by the UE.

Figure 7:
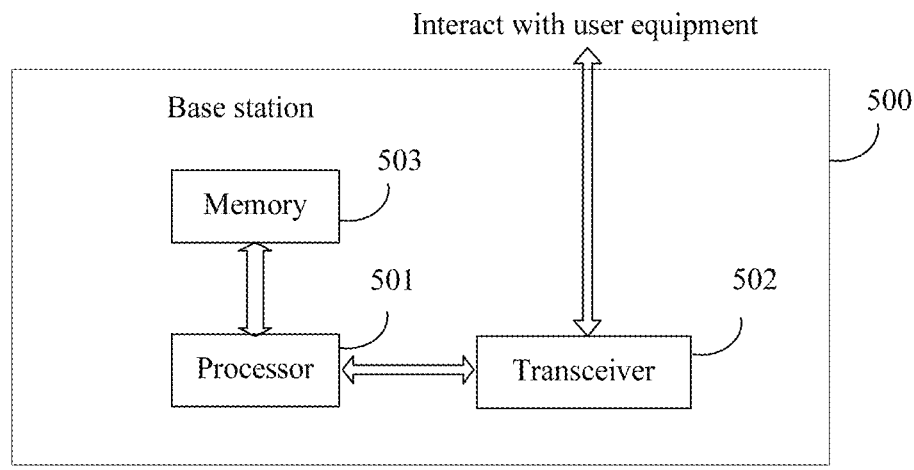
FIG. 7 is a schematic diagram of a composition structure of a base station according to an embodiment of the present invention.

FIG. 7 is a schematic diagram of a composition structure of a base station 500 according to an embodiment of the present invention. As shown in FIG. 7, the base station 500 includes: a processor 501, a transceiver 502, and a memory 503.

The transceiver 502 is configured to interact with UE.

The memory 503 may be a permanent memory, for example, a hard disk drive and a flash memory, and the memory 503 has a software module and a device driver. The software module can execute various function modules of the method in the embodiments of the present invention, and the device driver may be a network and interface driver.

When being enabled, the software components are loaded into the memory 503, and then are accessed by the processor 501 and execute a corresponding instruction.

The processor 501 is configured to perform rate matching of a unicast signal according to an MBSFN RS.

The processor 501 is further configured to send the unicast signal to the UE by using the transceiver 502.

Specifically, the processor 501 performs rate matching of the unicast signal according to the MBSFN RS, which may be understood as that a resource element RE corresponding to the MBSFN RS is not used to transmit the unicast signal. The processor 501 determines, according to the MBSFN RS, a resource element used to transmit the unicast signal, that is, performs resource mapping, and allocates, in a data frame, the resource element used to transmit the unicast signal.

Optionally, the processor 501 is further configured to dynamically send DCI to the UE by using the transceiver 502.

The DCI is used to instruct the UE to perform rate de-matching and receive the unicast signal according to the MBSFN RS. Preferably, the DCI is used to instruct the UE to perform rate de-matching and receive the unicast signal in the at least one MBSFN subframe according to the MBSFN RS. Therefore, resource usage is increased, and continuity and effectiveness of performing broadcast multicast related measurement by the UE performing MBMS measurement can be ensured.

Optionally, the DCI is used to indicate that a resource element RE corresponding to the MBSFN RS is not used to transmit the unicast signal. Preferably, the DCI is further used to indicate that a resource element RE corresponding to an MBSFN RS in the at least one MBSFN subframe is not used to transmit the unicast signal.

The subframe in which the processor 501 sends the unicast signal by using the transceiver 502 further includes one or more of: a cell-specific reference signal CRS, a channel state information-reference signal CSI-RS, a channel state information-interference measurement resource CSI-IMR, a demodulation reference signal DMRS, or a positioning reference signal PRS.

Preferably, the processor 501 may further send control signaling to the UE by using the transceiver 502, to indicate that the subframe in which the unicast signal is transmitted may further include one or more of: a cell-specific reference signal CRS, a channel state information-reference signal CSI-RS, a channel state information-interference measurement resource CSI-IMR, a demodulation reference signal DMRS, or a positioning reference signal PRS.

An RE transmitting the CRS, the CSI-RS, the CSI-IM, the DMRS, and the PRS is not used to transmit the unicast signal, so that the base station and the UE need to perform corresponding rate matching and rate de-matching. Therefore, the signals may be transmitted in the MBSFN subframe, for measurement by the UE, and the rate matching and the rate de-matching are accurate.

The subframe in which the unicast signal is transmitted is at least one MBSFN subframe. Alternatively, the subframe in which the unicast signal is transmitted may be any subframe in which the UE assumes that an MBSFN RS is transmitted.

Optionally, the processor 501 sends control signaling (signaling, such as DCI or RRC) by using the transceiver 502, where the control instruction may be further used to indicate the UE that a first RE or an RE group in an RE corresponding to a pilot signal used to demodulate the unicast signal is not used to demodulate the unicast signal.

The first RE or the RE group is specifically: an RE or an RE group or a subset of an RE group on which a demodulation pilot corresponding to the unicast signal is overlapped with the MBSFN RS, or an RE or an RE group that is predefined or that is configured by higher layer signaling. The first RE or the RE group specifically includes one or more of the following: an RE or an RE group on which the CRS is overlapped with the MBSFN RS, an RE or an RE group on which the DMRS is overlapped with the MBSFN RS, or an RE or an RE group that is predefined or that is configured by higher layer signaling. Correspondingly, when the UE receives the control signaling, according to the control signaling, the first RE or the RE group is not used to demodulate the unicast signal. Therefore, completeness of the MBSFN RS is ensured, accuracy and effectiveness of MBSFN RS related measurement are ensured, and the UE receiving the unicast signal can also demodulate the unicast signal according to an actual demodulation pilot.

Specifically, the base station further performs the method in the foregoing embodiment according to the instruction, and details are not described herein again.

Figure 8:
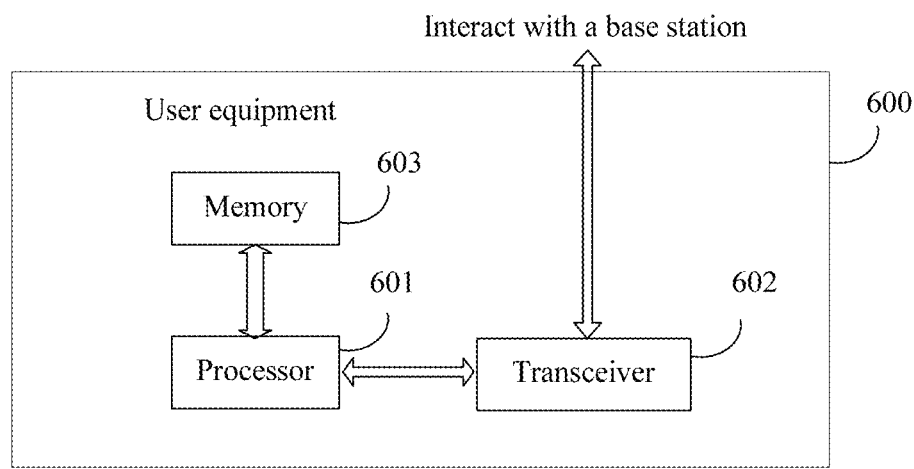
FIG. 8 is a schematic diagram of a composition structure of user equipment according to an embodiment of the present invention.

FIG. 8 is a schematic diagram of a composition structure of user equipment 600 according to an embodiment of the present invention. As shown in FIG. 8, the user equipment 600 includes: a processor 601, a transceiver 602, and a memory 603.

The transceiver 602 is configured to interact with a base station.

The memory 603 may be a permanent memory, for example, a hard disk drive and a flash memory, and the memory 603 has a software module and a device driver. The software module can execute various function modules of the method in the embodiments of the present invention, and the device driver may be a network and interface driver.

When being enabled, the software components are loaded into the memory 603, and then are accessed by the processor 601 and execute a corresponding instruction.

The processor 601 is configured to receive, by using the transceiver 602, a unicast signal sent by the base station.

The unicast signal is obtained by the base station by performing rate matching of the unicast signal according to an MBSFN RS. It may be understood that, a resource element RE corresponding to the MBSFN RS is not used to transmit the unicast signal. The base station determines, according to the MBSFN RS, a resource element used to transmit the unicast signal, that is, performs resource mapping, and allocates, in a data subframe, the resource element used to transmit the unicast signal.

The processor 601 is further configured to perform rate de-matching of the unicast signal according to the MBSFN RS when receiving the unicast signal by using the transceiver 602.

Optionally, the processor 601 is further configured to receive, by using the transceiver 602, DCI sent by the base station.

The DCI is used to instruct the UE to perform rate de-matching and receive the transmitted unicast signal according to the MBSFN reference signal MBSFN RS. Preferably, the DCI is further used to instruct the UE to perform rate de-matching and receive the unicast signal in the at least one MBSFN subframe according to the MBSFN RS.

Optionally, the DCI is used to indicate that a resource element RE corresponding to the MBSFN RS is not used to transmit the unicast signal. Preferably, the DCI is used to indicate that a resource element RE corresponding to an MBSFN RS in the at least one MBSFN subframe is not used to transmit the unicast signal.

Optionally, the subframe in which the processor 601 receives the unicast signal by using the transceiver 602 may further include one or more of: a cell-specific reference signal CRS, a channel state information-reference signal CSI-RS, a channel state information-interference measurement resource CSI-IMR, a demodulation reference signal DMRS, or a positioning reference signal PRS.

Preferably, the processor 601 may be further configured to receive, by using the transceiver 602, control signaling sent by the base station, where the control signaling is used to indicate that the subframe in which the unicast signal is transmitted may further include one or more of: a cell-specific reference signal CRS, a channel state information-reference signal CSI-RS, a channel state information-interference measurement resource CSI-IMR, a demodulation reference signal DMRS, or a positioning reference signal PRS. The control signaling herein may be higher layer signaling (for example, RRC signaling) or DCI signaling.

AN RE transmitting the CRS, the CSI-RS, the CSI-IM, the DMRS, and the PRS is not used to transmit the unicast signal, so that the base station and the UE need to perform corresponding rate matching and rate de-matching.

Optionally, when the processor 601 receives the unicast signal by using the transceiver 602, a first RE or an RE group in an RE corresponding to a pilot signal used to demodulate the unicast signal is not used to demodulate the unicast signal. The first RE or the RE group is specifically: an RE or an RE group or a subset of an RE group on which a demodulation pilot corresponding to the unicast signal is overlapped with the MBSFN RS. The demodulation pilot may be a CRS or a DMRS. For example, the first RE or the RE group specifically includes one or more of the following: an RE or an RE group on which the CRS is overlapped with the MBSFN RS, an RE or an RE group on which the DMRS is overlapped with the MBSFN RS, or an RE or an RE group that is predefined or that is configured by higher layer signaling. Preferably, the control signaling, for example, DCI signaling or higher layer signaling (for example, RRC signaling) may be used to indicate that the first RE or the RE group is not used to demodulate the unicast signal. Correspondingly, when the UE receives the control signaling such as the DCI, according to the control signaling such as the DCI, the first RE or the RE group is not used to demodulate the unicast signal.

Another manner is that N RE groups are predefined or configured by higher layer signaling, and an information unit in the DCI may indicate a specific RE group that is not used to demodulate a signal of unicast transmission.

For example, if the subframe in which the unicast signal is sent includes the CRS, after the processor 601 performs rate de-matching of the unicast signal, the processor 601 is further configured to demodulate the unicast signal by using the CRS according to the control signaling (the DCI), where the RE or the RE group on which the CRS is overlapped with the MBSFN RS is not used to demodulate the unicast signal.

For example, if the subframe in which the unicast signal is sent includes the DMRS, after the processor 601 performs rate de-matching of the unicast signal, the processor 601 is further configured to demodulate the unicast signal by using the DMRS according to the DCI, where the RE or the RE group on which the DMRS is overlapped with the MBSFN RS is not used to demodulate the unicast signal.

It should be noted that, in the foregoing two cases, the control signaling (for example, DCI or RRC signaling) that is sent by the base station and that is received by the transceiver 602 may not indicate that the RE or the RE group on which the CRS or the DMRS in the MBSFN subframe is overlapped with the MBSFN RS is not used to demodulate the unicast signal. Alternatively, the control signaling may indicate that the RE or the RE group on which the CRS or the DMRS in the MBSFN subframe is overlapped with the MBSFN RS is not used to demodulate the unicast signal.

According to the signal transmission method and the apparatus provided in the embodiments of the present invention, a base station performs rate matching of a unicast signal according to an MBSFN RS, so that the base station may transmit the unicast signal by using an idle MBSFN subframe, thereby increasing resource usage. For uninterested UE, the base station may further instruct, by using DCI, the UE to perform rate de-matching and receive the unicast signal in the at least one MBSFN subframe according to the MBSFN RS, which can avoid an idle subframe and increase resource usage. In addition, the MBSFN RS may always be transmitted in the MBSFN subframe that needs to be measured by the UE, so that the UE performs MBSFN related measurement, thereby ensuring continuity and effectiveness of performing broadcast multicast related measurement by the UE. The base station instructs, by using the DCI, the UE to perform rate de-matching and receive the unicast signal according to the MBSFN RS. In this way, the UE is completely controlled by the base station to perform rate de-matching processing of unicast signal transmission, so as to be consistent with processing of the base station and correctly receive a unicast signal.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the principle of the present invention should fall within the protection scope of the present invention.

What is claimed is:

1. A base station communicating with a terminal device, comprising:
   a transceiver configured to interact with the terminal device; and
   a processor configured to
      perform rate matching of a unicast signal, capable of being demodulated using a pilot signal, according to a multicast/broadcast single frequency network reference signal (MBSFN RS) to match a quantity of data units to the quantity of resource elements; and
      send, to the terminal device via the transceiver, the unicast signal and control signaling indicating not to use either of a first resource element (RE) corresponding to the pilot signal and an RE group corresponding to the pilot signal to demodulate the unicast signal.

2. The base station according to claim 1, wherein the processor is further configured to send downlink control information (DCI), to the terminal device by using the transceiver, wherein the DCI is used to instruct the terminal device to perform rate de-matching and receive the unicast signal according to the MBSFN RS.

3. The base station according to claim 1, wherein a subframe in which the processor sends the unicast signal by using the transceiver comprises one or more of: a cell-specific reference signal (CRS), a channel state information-reference signal (CSI-RS), a channel state information-interference measurement resource (CSI-IMR), a demodulation reference signal (DMRS), or a positioning reference signal (PRS).

4. The base station according to claim 1, wherein the one of the first RE and the RE group is specifically at least one RE on which a demodulation pilot corresponding to the unicast signal is overlapped with the MBSFN RS, or is predefined or is configured by higher layer signaling.

5. The base station according to claim 1, wherein the base station is an evolved NodeB (eNodeB), a radio base station (NodeB), a radio network controller (RNC), or a repeater.

6. A terminal device communicating with a base station, comprising:
   a transceiver configured to interact with the base station; and
   a processor configured to
      receive, by using the transceiver, a unicast signal capable of being demodulated using a pilot signal and sent by the base station and control signaling indicating not to use either of a first resource element (RE) corresponding to the pilot signal or an RE group corresponding to the pilot signal to demodulate the unicast signal, wherein the unicast signal is obtained by the base station by performing rate matching of the unicast signal according to a multicast/broadcast single frequency network reference signal (MBSFN RS) to match a quantity of data units to the quantity of resource elements; and
      perform rate de-matching of the unicast signal according to the MBSFN RS when receiving the unicast signal by using the transceiver.

7. The terminal device according to claim 6, wherein the processor is further configured to receive, by using the transceiver, downlink control information (DCI) sent by the base station, wherein the DCI is used to instruct the terminal device to perform rate de-matching and receive the transmitted unicast signal according to the MBSFN RS.

8. The terminal device according to claim 6, wherein a subframe in which the processor receives the unicast signal by using the transceiver comprises one or more of: a cell-specific reference signal (CRS), a channel state information-reference signal (CSI-RS), a channel state information-interference measurement resource (CSI-IMR), a demodulation reference signal (DMRS), or a positioning reference signal (PRS).

9. The terminal device according to claim 6, wherein
   the first RE or the RE group is specifically at least one RE on which a demodulation pilot corresponding to the unicast signal is overlapped with the MBSFN RS, or is predefined or is configured by higher layer signaling, and
   the processor is configured to avoid using, according to the control signaling, the at least one RE to demodulate the unicast signal.

10. A signal transmission method, comprising:
   sending, by a base station, control signaling to a terminal device, the control signaling indicating not to use either of a first resource element (RE) corresponding to a pilot signal and an RE group corresponding to the pilot signal to demodulate a unicast signal capable of being demodulated using the pilot signal;
   performing, by the base station, rate matching of the unicast signal according to a multicast/broadcast single frequency network reference signal (MBSFN RS) to match a quantity of data units to the quantity of resource elements; and
   sending, by the base station, the unicast signal to the terminal device.

11. The method according to claim 10, wherein the method further comprises:
   sending, by the base station, downlink control information (DCI) to the terminal device, wherein the DCI is used to instruct the terminal device to perform rate de-matching and receive the unicast signal according to the MBSFN RS.

12. The method according to claim 10, wherein a subframe in which the base station sends the unicast signal comprises one or more of: a cell-specific reference signal (CRS), a channel state information-reference signal (CSI-RS), a channel state information-interference measurement resource (CSI-IMR), a demodulation reference signal (DMRS), or a positioning reference signal (PRS).

13. The method according to claim 10, wherein the one of the first RE and the RE group is specifically: at least one RE on which a demodulation pilot corresponding to the unicast signal is overlapped with the MBSFN RS, or is predefined or is configured by higher layer signaling.

* * * * *